United States Patent
Maegawa et al.

(10) Patent No.: US 9,584,809 B2
(45) Date of Patent: Feb. 28, 2017

(54) ENCODING CONTROL APPARATUS AND ENCODING CONTROL METHOD

(71) Applicant: Sony Corporation, Tokyo (JP)

(72) Inventors: Hirotoshi Maegawa, Tokyo (JP);
Kazuhito Ikemoto, Kanagawa (JP);
Matsumoto Hideki, Tokyo (JP)

(73) Assignee: Sony Corporation, Tokyo (JP)

( * ) Notice: Subject to any disclaimer, the term of this patent is extended or adjusted under 35 U.S.C. 154(b) by 103 days.

(21) Appl. No.: 14/419,065

(22) PCT Filed: Jul. 9, 2013

(86) PCT No.: PCT/JP2013/068769
§ 371 (c)(1),
(2) Date: Feb. 2, 2015

(87) PCT Pub. No.: WO2014/054325
PCT Pub. Date: Apr. 10, 2014

(65) Prior Publication Data
US 2015/0195531 A1 Jul. 9, 2015

(30) Foreign Application Priority Data

Oct. 5, 2012 (JP) .................. 2012-223045

(51) Int. Cl.
*H04N 19/107* (2014.01)
*H04N 19/172* (2014.01)
*H04N 19/142* (2014.01)
*H04N 19/87* (2014.01)

(52) U.S. Cl.
CPC ......... *H04N 19/107* (2014.11); *H04N 19/142* (2014.11); *H04N 19/172* (2014.11); *H04N 19/87* (2014.11)

(58) Field of Classification Search
None
See application file for complete search history.

(56) References Cited

U.S. PATENT DOCUMENTS 5,666,162 A * 9/1997 Iizuka .................. H04N 19/503
348/14.15
5,832,121 A * 11/1998 Ando .................. H04N 19/503
348/700

(Continued)

FOREIGN PATENT DOCUMENTS

JP 04-257185 9/1992
JP 09-023423 1/1997

(Continued)

*Primary Examiner* — Bernard Krasnic
(74) *Attorney, Agent, or Firm* — Paratus Law Group, PLLC (57) ABSTRACT

There is provided an encoding control apparatus including a scene change detector that detects occurrence of scene change in frame images generated in real time by a renderer, and an encoder controller that controls an encoder that encodes each of the frame images in any of a first scheme in which another frame image is not referred to and a second scheme in which the other frame image is referred to, the encoder controller causing the encoder to encode a frame image after the scene change in the first scheme when the occurrence of the scene change is detected.

14 Claims, 10 Drawing Sheets

(56) References Cited

U.S. PATENT DOCUMENTS

| | | | | |
|---|---|---|---|---|
| 6,057,893 | A | * 5/2000 | Kojima | H04N 5/147 348/699 |
| 2007/0014357 | A1 | * 1/2007 | Jeon | H04N 19/117 375/240.15 |
| 2008/0089416 | A1 | * 4/2008 | Jeon | H04N 19/117 375/240.15 |
| 2009/0097546 | A1 | * 4/2009 | Lee | H04N 19/61 375/240.02 |
| 2010/0220785 | A1 | * 9/2010 | Alfonso | H04N 19/00163 375/240.13 |

FOREIGN PATENT DOCUMENTS

| | | |
|---|---|---|
| JP | 2011-097401 | 5/2011 |
| WO | WO2011/028666 A1 | 3/2011 |

\* cited by examiner

ENCODING CONTROL APPARATUS AND ENCODING CONTROL METHOD

CROSS REFERENCE TO PRIOR APPLICATION

This application is a National Stage Patent Application of PCT International Patent Application No. PCT/JP2013/068769 (filed on Jul. 9, 2013) under 35 U.S.C. §371, which claims priority to Japanese Patent Application No. 2012-223045 (filed on Oct. 5, 2012), which are all hereby incorporated by reference in their entirety.

TECHNICAL FIELD

The present disclosure relates to an encoding control apparatus and an encoding control method.

BACKGROUND ART

In encoding video, it is common to use interframe prediction to obtain high compression efficiency. In the encoding using the interframe prediction, intra-frames and inter-frames are configured. In the intra-frame, a frame image is independently encoded without reference to another frame image. On the other hand, in the inter-frame, a frame image is encoded with reference to one or plural other frame images positioned earlier or later in time. Since in the inter-frame, the frame image can be encoded by defining a difference from the other frame images, exceedingly high compression efficiency can be obtained.

Meanwhile, a technology is proposed in which encoding processing is changed according to the contents of the video to improve image quality under a limited amount of data. For example, Patent Literature 1 discloses a technology in which a portion with a complex pattern in the frame image is beforehand detected, the quantization step width for the portion is increased in encoding, and thereby, excessively large data is prevented from occurring to maintain the image quality in the entire frame image. In such a technology, 2-pass encoding processing is performed in which the contents of the frame image are analyzed first, and using the result, the encoding is performed.

However, such a technology is not suitable for, for example, streaming in which the frame images generated in real time are sequentially encoded to be sent. When the generation and the sending of the frame images have to be in real time, the processing time is limited and the encoding processing is basically performed in a 1-pass manner. Therefore, 2-pass encoding processing as above is difficult to be adopted. Hence, in Patent Literature 2, a technology is proposed in which the degree of encoding difficulty is beforehand defined for each of the kinds of the video (for example, "motion picture" and the like), based on this, the bit rate in encoding is determined, and thereby, optimization of the encoding processing is alternatively realized in the 1-pass encoding processing.

CITATION LIST

Patent Literature

Patent Literature 1: JP H4-257185A
Patent Literature 2: JP H9-23423A

SUMMARY OF INVENTION

Technical Problem

However, even using the technology, for example, disclosed in Patent Literature 2, the optimization of the encoding processing in the streaming is not sufficient. For example, when scene change at which most part of the image is replaced between the continuous frame images occurs and then a frame image after the scene change is encoded as the image in the inter-frame, the most part of the image becomes a difference from the frame image before the scene change which image is referred to. Therefore, this can cause an unpreferable state such as a decrease in compression efficiency and unclearness of display of the image after the scene change.

Therefore, in the present disclosure, an encoding control apparatus and an encoding control method that are novel and improved are proposed in which encoding processing on frame images generated in real time can be properly performed at scene change.

Solution to Problem

According to an embodiment of the present disclosure, there is provided an encoding control apparatus including a scene change detector that detects occurrence of scene change in frame images generated in real time by a renderer, and an encoder controller that controls an encoder that encodes each of the frame images in any of a first scheme in which another frame image is not referred to and a second scheme in which the other frame image is referred to, the encoder controller causing the encoder to encode a frame image after the scene change in the first scheme when the occurrence of the scene change is detected.

According to an embodiment of the present disclosure, there is provided an encoding control method including detecting occurrence of scene change in frame images generated in real time by a renderer, and controlling an encoder that encodes each of the frame images in any of a first scheme in which another frame image is not referred to and a second scheme in which the other frame image is referred to, and causing the encoder to encode a frame image after the scene change in the first scheme when the occurrence of the scene change is detected.

In such configurations, even for the frame images generated in real time, the occurrence of the scene change is detected and the presence or absence of the scene change is reflected to the encoding processing. This can reduce the sense of discomfort of the user who observes the frame images.

Advantageous Effects of Invention

As described above, according to the present disclosure, for frame images generated in real time, proper encoding processing can be performed at scene change.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Notably, the description is made in the following order.
1. Configuration of Streaming System
 1-1. Overall Configuration
 1-2. Configurations of Client and Server
 1-3. Configuration of Streaming Processor
2. Configuration Regarding Encoding Control
 2-1. First Embodiment
 2-2. Second Embodiment
3. Hardware Configuration
4. Supplement (1. Configuration of Streaming System)

First, with reference to FIG. 1 to FIG. 4, a configuration of a streaming system to which an embodiment of the present disclosure is applied is described.

(1-1. Overall Configuration)

Figure 1:
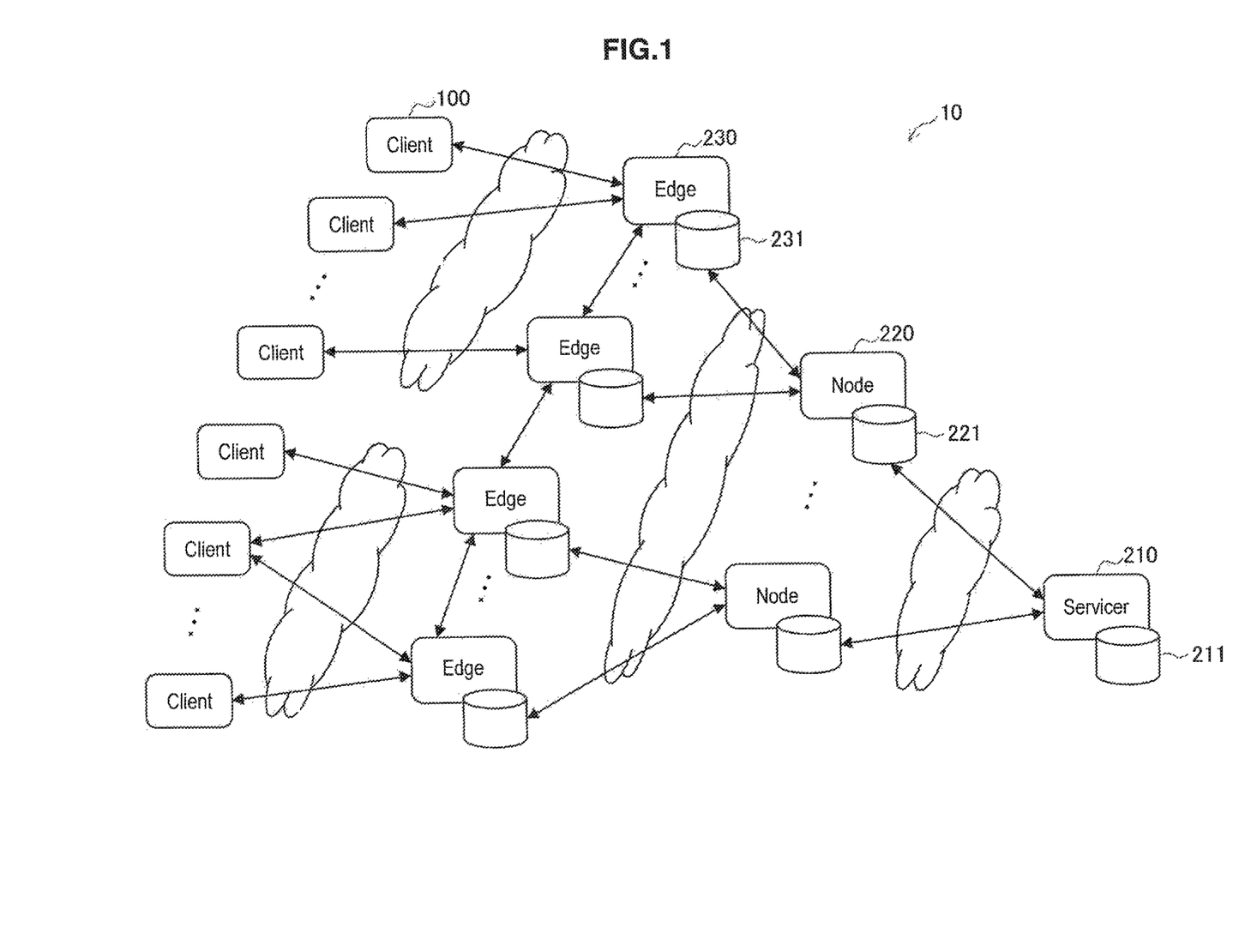
FIG. 1 is a diagram schematically showing an overall configuration of a streaming system according to an embodiment of the present disclosure.

FIG. 1 is a diagram schematically showing an overall configuration of the streaming system according to the embodiment of the present disclosure. With reference to FIG. 1, a streaming system 10 includes clients 100, and servers (a servicer 210, nodes 220 and edges 230) for distributing streaming content to the clients 100. The clients 100 and the servers are connected to one another via various kinds of wired and/or wireless networks.

The servicer 210 retains original content 211. The node 220 is a node constituting a content delivery network (CDN) and retains content 221 obtained by copying the original retained by the servicer 210. The edge 230 directly communicates with the clients 100 and properly processes the content according to a request to be provided to the client 100. In this stage, the edge 230 acquires the content retained by the node 220 as a cache 231, which is provided according to a request from the client 100.

Figure 2:
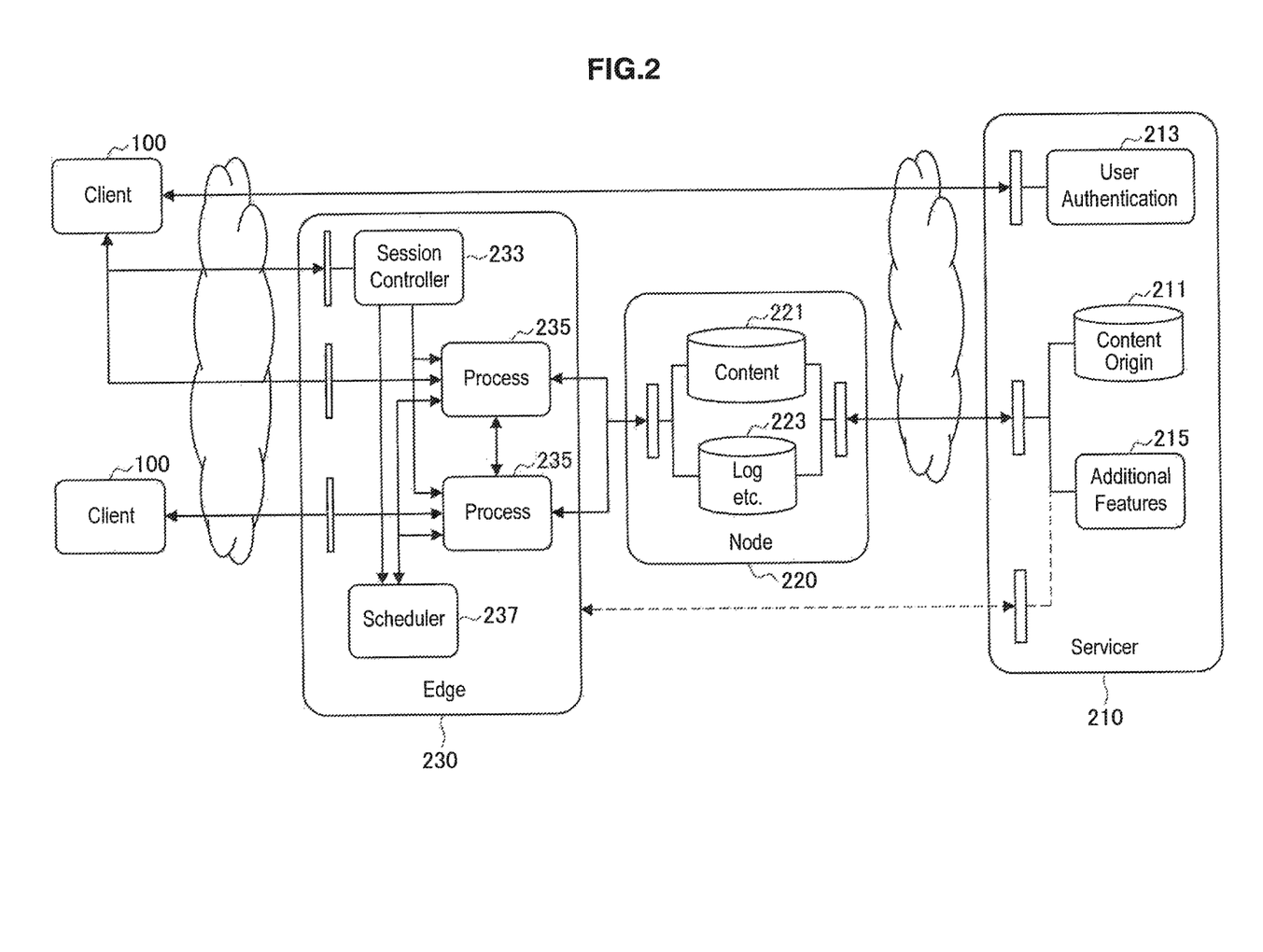
FIG. 2 is a diagram showing an example of a flow of information in a streaming system according to an embodiment of the present disclosure.

FIG. 2 is a diagram showing an example of an information flow in the streaming system according to the embodiment of the present disclosure. Prior to the distribution of the content, the client 100 accesses a user authentication module 213 of the servicer 210 to log in to the service. The client 100 which has successfully logged in accesses a session controller 233 of the edge 230 to request initiation of a process for the client 100. According to this, the session controller 233 launches a process 235.

In the edge 230, the process 235 is launched for each client 100 and processing for content distribution according to a request from each client 100 is performed. Accordingly, when the edge 230 provides the service to the plural clients 100, the plural processes 235 can be launched in the edge 230. Each process 235 is scheduled by a scheduler 237. The scheduler 237 is controlled by the session controller 233.

Meanwhile, the original content 211 retained by the servicer 210 is beforehand copied in the nodes 220 and retained as the content 221. According to the request from the client 100, the process 235 initiated in the edge 230 acquires the content 221 retained in the node 220 as a cache and properly processes this to be provided to the client 100. In this stage, the process 235 may record a log on how the content is provided according to what kind of request from the client 100. The log and other information may be provided to the node 220 by the process 235 and may be retained as information 223. The information 223 such as the log can be used, for example, by additional features 215 of the servicer 210.

(1-2. Configurations of Client and Server)

Figure 3:
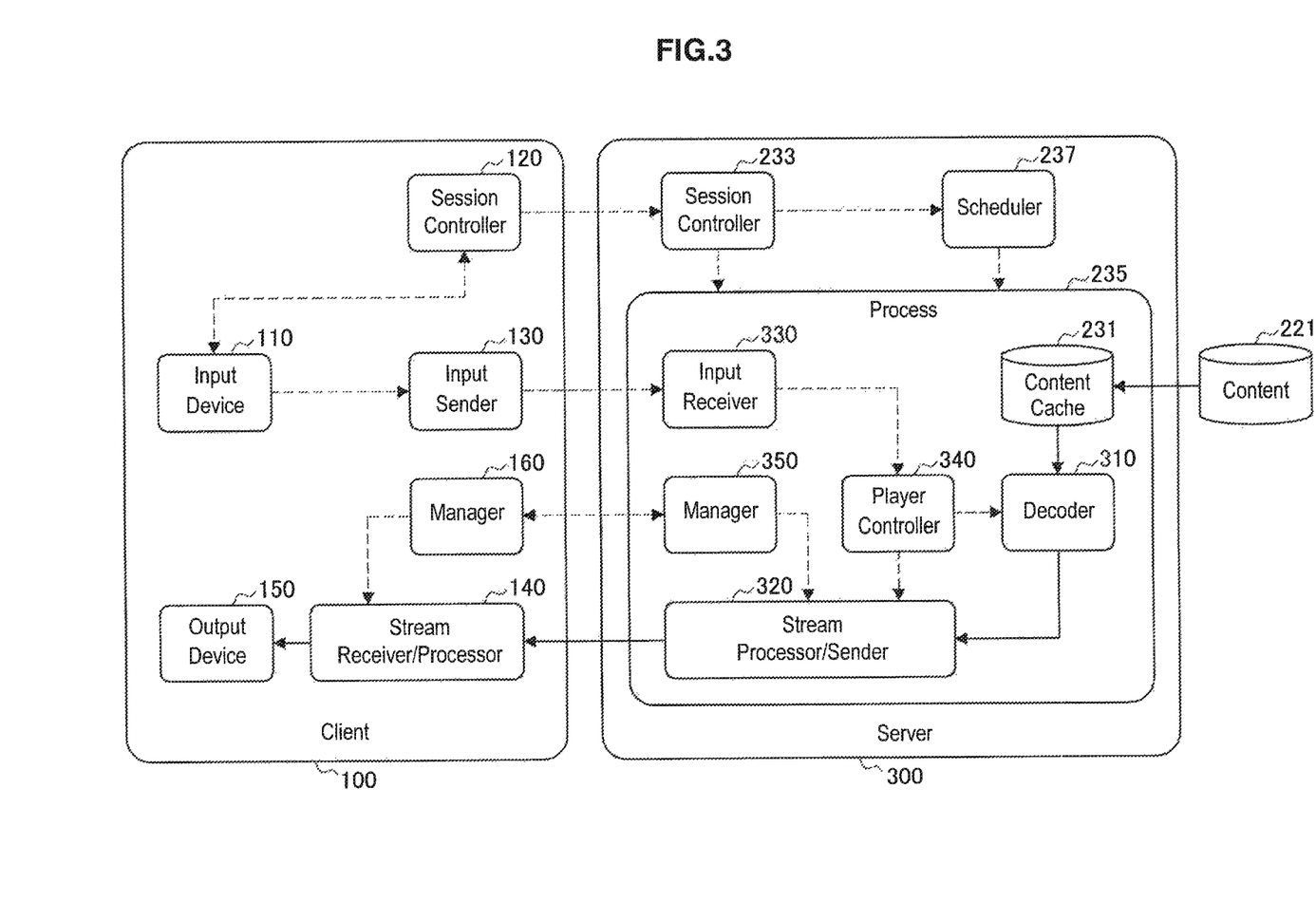
FIG. 3 is a diagram schematically showing functional configurations of a client and a server of a streaming system according to an embodiment of the present disclosure.

FIG. 3 is a diagram schematically showing functional configurations of the client and the server of the streaming system according to the embodiment of the present disclosure. Notably, a server 300 is the server which functions as the edge 230 in the streaming system described with reference to FIGS. 1 and 2. In the figure, solid lines indicate flows of the streaming content distributed to the client 100 and broken lines indicate flows of control information regarding playing back of the streaming content.

The client 100 is a device providing the streaming content to the user and examples thereof can include, for example, various kinds of personal computers, tablet terminals, mobile phones (including smart phones), media players, game machines and the like. On the other hand, the server 300 is an aggregate of functions realized by a single server device or cooperation of plural server devices connected to one another via various kinds of wired and/or wireless networks. Any of the client 100 and the server devices constituting the server 300 can be realized, for example, using a hardware configuration of an information processing apparatus mentioned later. Among the shown constituents, the individual portions except an input device, an output device and data (stored in a memory device) can be realized by software with a processor such, for example, as a central processing unit (CPU).

In the client 100, the input device 110 acquires operation input of the user. The input device 110 acquires operation input for the outside of the content, such, for example, as login to the service, and selection of the content, and operation input for the inside of the content, such, for example, as switching of a still image/moving image, magnification/shrinkage of an image, and switching of audio quality of voice. The operation input for the outside of the content is processed by a session controller 120. The session controller 120, for example, sends input information regarding the login to the servicer 210, and sends a request for initiating the process to the server 300 after the login. Meanwhile, the operation input for the inside of the content is sent from an input sender 130 to the server 300.

In the server 300, the session controller 233 launches the process 235 according to the request for initiating the process from the client 100. The process 235 acquires the content 221 designated by the content selection operation acquired by the input device 110 in the client 100, and retains it as the content cache 231. The content cache 231 is encoded data, and in the server 300, the decoder 310 decodes it. The decoded content data is processed in a stream processor/sender 320.

Meanwhile, the operation input, for the inside of the content, acquired by the input device 110 in the client 100 is received by an input receiver 330 and provided to a player controller 340. The player controller 340 controls, according to the operation input, a decoder 310 and the stream processor/sender 320. The stream processor/sender 320 generates, according to the control, video and/or voice from the content data. Furthermore, the stream processor/sender 320 encodes the generated video and/or voice to be sent to the client 100. Notably, in the shown example, while the content contains the video and the voice, in another example, the content may contain only the video or may contain only the voice.

The encoded data sent to the client 100 is decoded in a stream receiver/processor 140 and undergoes rendering as the video and/or the voice to be output from the output device 150 to the user. Herein, the stream processor/sender 320 on the server side and the stream receiver/processor 140 on the client side are managed by a manager 350 and a manager 160, respectively. The manager 350 on the server side and the manager 160 on the client side exchange information therebetween to work in cooperation with each other as needed.

(1-3. Configuration of Streaming Processor)

Figure 4:
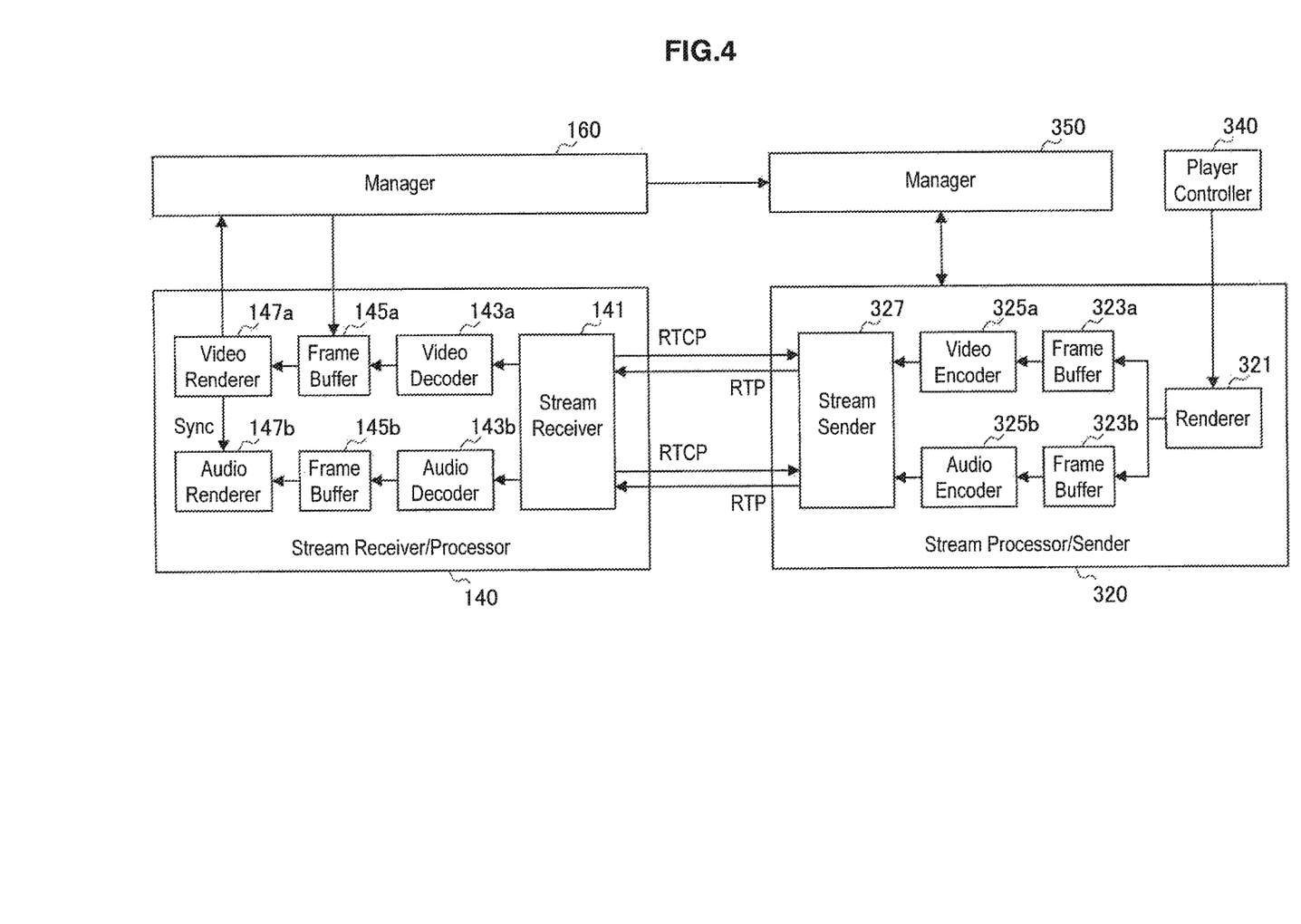
FIG. 4 is a diagram schematically showing a functional configuration of a streaming processor in an embodiment of the present disclosure.

FIG. 4 is a diagram schematically showing a functional configuration of the streaming processor in the embodiment of the present disclosure. In the figure, functional configurations of the stream receiver/processor 140 of the client 100 and the stream processor/sender 320 of the server 300 are respectively illustrated.

(Client Side)

The stream receiver/processor 140 includes a stream receiver 141, a decoder 143, a frame buffer 145 and a renderer 147. The stream receiver 141 receives data from a stream sender 327 on the server side according to a predetermined protocol. In the shown example, the real-time transport protocol (RTP) is used. In this case, the stream receiver 141 provides the received data to the decoder 143 and detects a communication state such as data delay to be reported to the stream sender 327 using the RTP control protocol (RTCP).

The decoder 143 decodes the data provided from the stream receiver 141 to obtain the video data and the voice data. The decoder 143 includes a video decoder 143a which decodes the video data and a voice decoder 143b which decodes the voice data. Plural kinds of each of the video decoder 143a and the voice decoder 143b may be prepared to be selectively used according to the format of the data as the processing target. Notably, in the description below, there is a case where both of the decoder 143a and the decoder 143b or any one of them are referred to simply as the decoder 143 (in the case where any one of them is designated, the voice or the video to be handled is explicitly presented).

The frame buffer 145 temporarily accumulates the video data and the voice data obtained in the decoder 143 on a frame-by-frame basis. The frame buffer 145 includes a frame buffer 145a which accumulates the video data and a frame buffer 145b which accumulates the voice data. The frame buffer 145, according to the control of the manager 160, provides the video data and the voice data in each frame to the renderer 147 in predetermined timing. Notably, in the description below, there is a case where both of the frame buffer 145a and the frame buffer 145b or any one of them are referred to simply as the frame buffer 145 (in the case where any one of them is designated, the voice or the video to be handled is explicitly presented).

The renderer 147 includes a video renderer 147a which performs rendering on the video data to be provided to the output device such as a display, and a voice renderer 147b which performs rendering on the voice data to be provided to the output device such as a speaker. The video renderer 147a and the voice renderer 147b cause the output frames of the video and the voice to be synchronized with each other. Moreover, the renderer 147 reports an ID of the output frame, time when the outputting is executed, and the like to the manager 160. Notably, in the description below, there is a case where both of the renderer 147a and the renderer 147b or any one of them are referred to simply as the renderer 147 (in the case where any one of them is designated, the voice or the video to be handled is explicitly presented).

(Server Side)

The stream processor/sender 320 includes a renderer 321, a frame buffer 323, an encoder 325 and the stream sender 327. The renderer 321 generates the video data and the voice data, using the content data decoded by the decoder 310 as a material, according to the control based on the operation input of the user by the player controller 340. Here, the frames are defined for the video data and the voice data, and the video data is generated as continuous frame images.

The frame buffer 323 temporarily accumulates the video data and the voice data generated in the renderer 321 on a frame-by-frame basis. The frame buffer 323 includes a frame buffer 323a which accumulates the video data and a frame buffer 323b which accumulates the voice data. The video data and the voice data accumulated in the frame buffer 323 are sequentially encoded by the encoder 325. Notably, in the description below, there is a case where both of the frame buffer 323a and the frame buffer 323b or any one of them are referred to simply as the frame buffer 323 (in the case where any one of them is designated, the voice or the video to be handled is explicitly presented).

The encoder 325 includes a video encoder 325a which encodes the video data and a voice encoder 325b which encodes the voice data. Plural kinds of each of the video encoder 325a and the voice encoder 325b may be prepared and may be selectively used according to the kinds of the video decoder 143a and the voice decoder 143b which can be used in the client 100 or the characteristics of the video data and the voice data as the processing targets. The encoded video data and voice data are sent from the stream sender 327 to the client 100. Notably, in the description below, there is a case where both of the encoder 325a and the encoder 325b or any one of them are referred to simply as the encoder 325 (in the case where any one of them is designated, the voice or the video to be handled is explicitly presented).

According to the configuration of the streaming system according to the embodiment as described above, in the server that functions as the edge, the video and/or the voice can be generated in real time to be distributed to the client according to the operation input of the user. Accordingly, an application, for example, disclosed in JP 2010-117828A, with which an image is freely magnified/shrunk and moved, and various applications such as browsing of large-sized images and video, on-line games, simulation viewers, and the like can be provided by streaming with responsiveness to the operation input of the user secured.

(2. Configuration Regarding Encoding Control)

Next, with reference to FIG. 5 to FIG. 9, configurations regarding encoding control in embodiments of the present disclosure are described. The configurations regarding the encoding control are described as first and second embodiments.

(2-1. First Embodiment)

Figure 5:
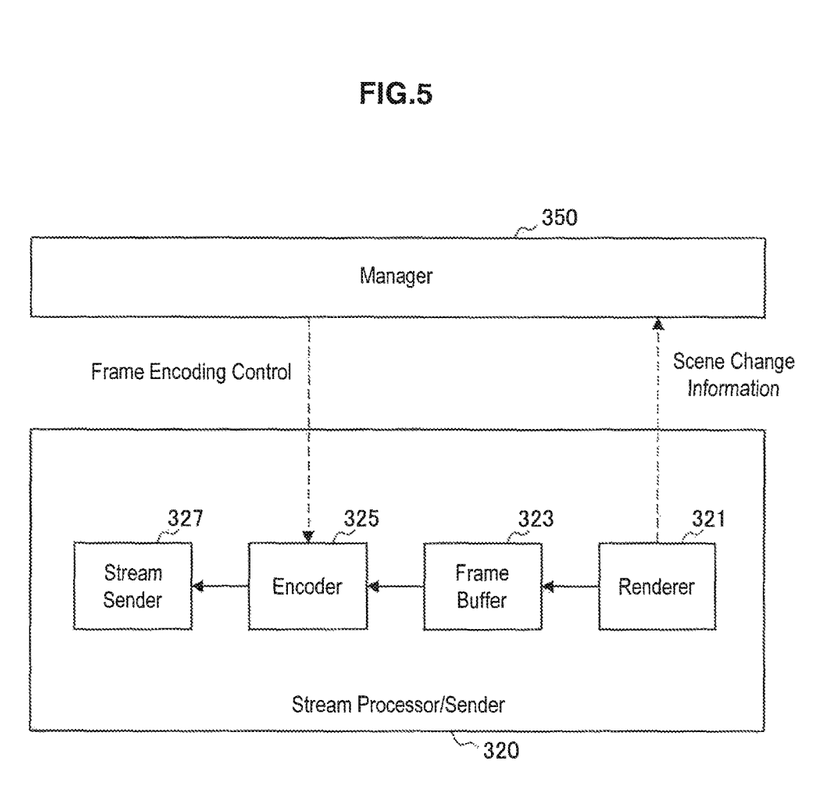
FIG. 5 is a diagram for explaining a first embodiment of the present disclosure.

FIG. 5 is a diagram for explaining the first embodiment of the present disclosure. As to the embodiment, in the stream processor/sender 320 of the server 300, the renderer 321 detects occurrence of scene change in frame images to provide scene change information to the manager 350, and the manager 350 controls encoding on the frame images in the encoder 325 based on the scene change information.

The renderer 321 generates, in real time, a series of frame images constituting the video data according to the operation input of the user acquired in the client 100 as mentioned above. Here, there is a case where scene change occurs in the frame images. The scene change, which can be readily understood considering, for example, that in a motion picture, is a state where most part of the image is replaced between continuous frame images. Herein, the entire image is not necessarily replaced. For example, in an application provided by the streaming system, when the image contains user interface (UI) for operation, information display and the like, such display is not replaced even in occurrence of the scene change.

In the embodiment, the renderer 321 detects the scene change which occurs in the generated frame images to provide the scene change information to the manager 350. For example, for an application with which images and video are browsed, the scene change occurs in the case where the browsed images and video are switched or the like. Moreover, for example, for an on-line game, the scene change occurs in the case where a character momentarily moves in the field with warp traveling or the like. Since the renderer 321 is the subject which generates the frame images using the content data as a material, it can detect such occurrence of the scene change relatively easily.

On the other hand, the encoder 325 encodes the frame images which are generated by the renderer 321 and accumulated in the frame buffer 323. At the encoding, the encoder 325 configures each frame as any of an intra-frame and an inter-frame. For the intra-frame, the frame image is independently encoded without reference to another frame image. On the other hand, for the inter-frame, the frame image is encoded with reference to another frame image. Since the encoding processing on the inter-frame is higher in compression efficiency and shorter in processing time, most of the frames are configured as the inter-frames. Accordingly, most of the frame images are encoded with reference to another frame image positioned earlier in time.

Nevertheless, when the scene change occurs in the frame images, the encoding processing on the inter-frame refers to the frame image before the scene change in encoding the frame image after the scene change. Therefore, especially immediately after the scene change, the frame image is not displayed clearly. After this frame, the display is gradually getting clearer as the frame images that are encoded with reference to the frame images after the scene change continue. In order to prevent such a state, the scene change only has to be beforehand detected to configure the frame after the scene change as the intra-frame.

Therefore, in the embodiment, when the scene change information indicating the occurrence of the scene change is acquired from the renderer 321 that functions as a scene change detector, the manager 350 that functions as an encoder controller controls the encoder 325 so as to configure the frame after the relevant scene change as the inter-frame. The encoder 325 that has undergone this control configures the frame after the scene change as the intra-frame to encode the frame image without reference to another frame image. Thereby, the frame images are displayed clearly from the frame immediately after the scene change.

However, since encoding processing time for the intra-frame is longer than encoding processing time for the inter-frame, there can be a case where the encoding processing has not been completed yet in the timing when the encoded data of the frame image after the scene change is output to the stream sender 327. In such a case, the encoder 325 outputs the encoded data of the frame image before the scene change instead to the stream sender 327 until the encoding on the frame image after the scene change is completed.

Notably, a period when the encoded data of the frame image before the scene change is being output, for example, may be dynamically configured according to an actual progressing state of the encoding processing on the frame image after the scene change, or may be preset based on a standard processing time of the encoding processing on the intra-frame. In the latter case, the encoder 325 outputs the encoded data of the frame image before the scene change to the stream sender 327 for a predetermined number of frames corresponding to the encoding processing time of the intra-frame.

Moreover, as to the outputting of the encoded data of the frame image before the scene change, the encoder 325 may retain a copy of the encoded data output previously to be continuously output. Otherwise, based on the control of the manager 350, the renderer 321 may output the frame image before the scene change to the encoder 325 and the encoder 325 may again encode this as the image in the inter-frame to be output to the stream sender 327.

Figure 6:
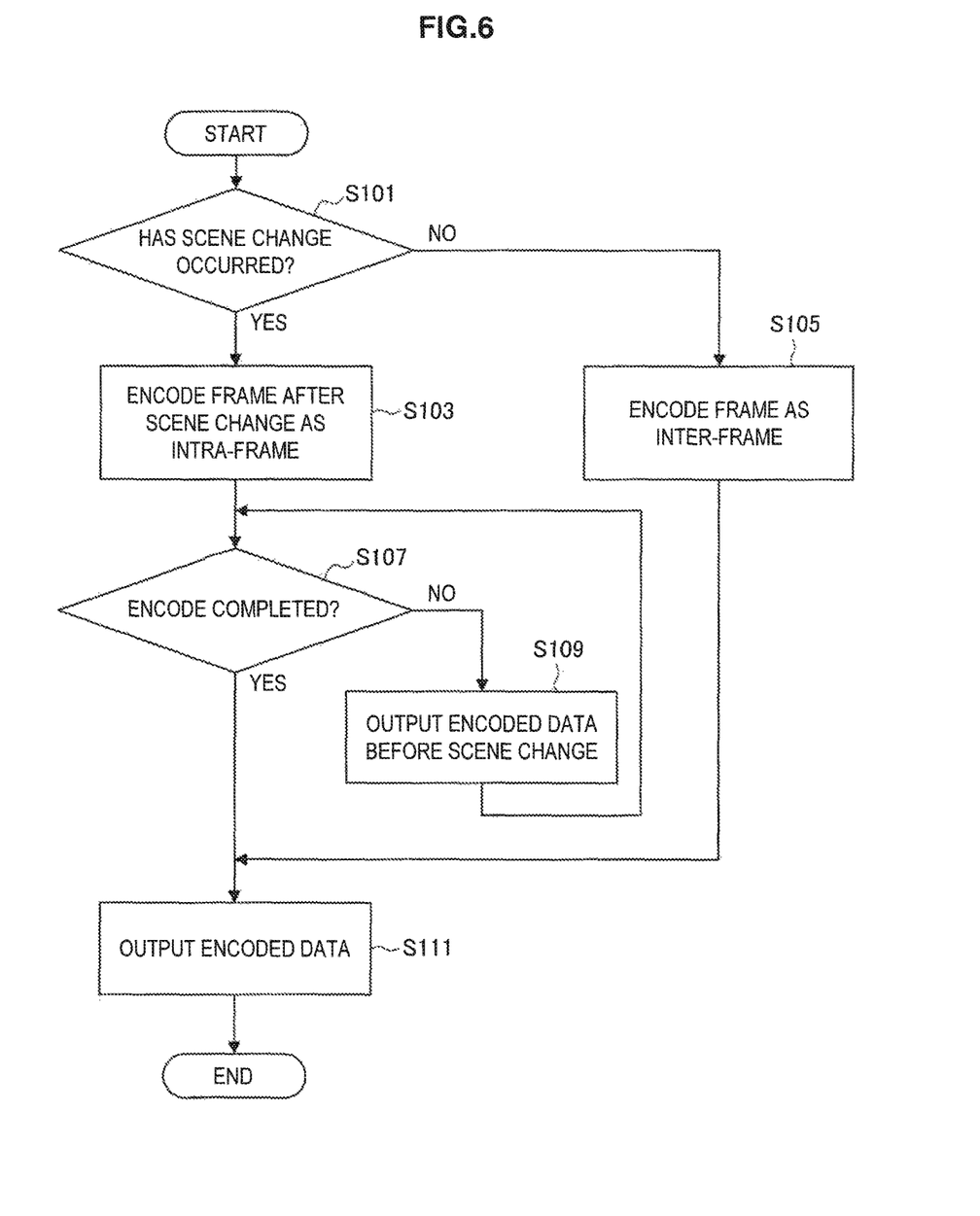
FIG. 6 is a flowchart showing an example of processing in the first embodiment of the present disclosure.

FIG. 6 is a flowchart showing an example of the processing in the first embodiment of the present disclosure. In the embodiment, the renderer 321 detects the occurrence of the scene change in the generated frame images, and when detected, provides the scene change information to the manager 350. Based on the scene change information, the manager 350 determines whether or not the scene change occurs (step S101), and according to the result, controls the encoder 325.

When it is determined that the scene change occurs in step S101 (YES), the manager 350 controls the encoder 325, and encodes the frame after the scene change as the intra-frame (step S103). Meanwhile, when it is not determined that the scene change occurs (NO), the encoder 325 encodes the frame as the inter-frame (step S105).

When the frame after the scene change is encoded as the intra-frame in step S103, the manager 350 determines whether or not the encoding is completed in the output timing of the relevant frame (step S107). Herein, when it is determined that the encoding is not completed (NO), the manager 350 controls and causes the encoder 325 to output the encoded data of the frame image before the scene change to the stream sender 327 (step S109).

Notably, the above-mentioned determination in step S107 may be omitted. In this case, for example, the encoder 325 automatically outputs the encoded data of the frame image before the scene change to the stream sender 327 for a predetermined number of frames corresponding to a standard processing time of the encoding processing on the intra-frame.

When it is determined that the encoding is completed in step S107 (YES), the encoder 325 outputs the encoded data of the frame image after the scene change to the stream sender 327 (step S111). Also when the encoding for the inter-frame (step S105) is completed, the encoded data is output to the stream sender 327 similarly.

In the first embodiment of the present disclosure, since the frame image after the scene change is encoded as the image in the intra-frame according to the processing as above, a clear frame image can be displayed from immediately after the scene change. Herein, there is a possibility that the display of the frame image after the scene change delays from the original timing by a slight amount (for example, by three frames, approximately 90 msec to 100 msec) due to the encoding processing time for the intra-frame. Nevertheless, during this, the frame image before the scene change is displayed as the substitute. Although the display of the image delays somewhat, a clear frame image is displayed from immediately after the scene change. This can diminish the sense of discomfort that the user feels.

(Modification)

Figure 7:
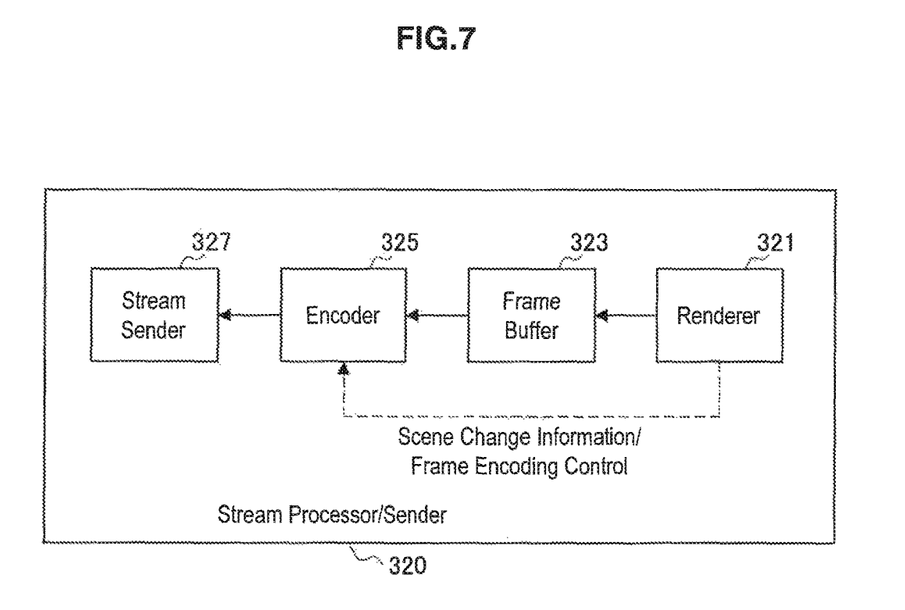
FIG. 7 is a diagram for explaining a modification of the first embodiment of the present disclosure.

FIG. 7 is a diagram for explaining a modification of the first embodiment of the present disclosure. In the modification, the renderer 321 or the encoder 325 itself functions as the encoder controller.

More specifically, when the renderer 321 detects the occurrence of the scene change in the generated frame images, it provides the scene change information to the encoder 325. The encoder 325 acquires the scene change information, and controls itself so as to encode the frame after the scene change as the intra-frame.

Otherwise, when the renderer 321 detects the occurrence of the scene change in the generated frame images, it may control and cause the encoder 325 to encode the frame after the scene change as the intra-frame.

(2-2. Second Embodiment)

Figure 8:
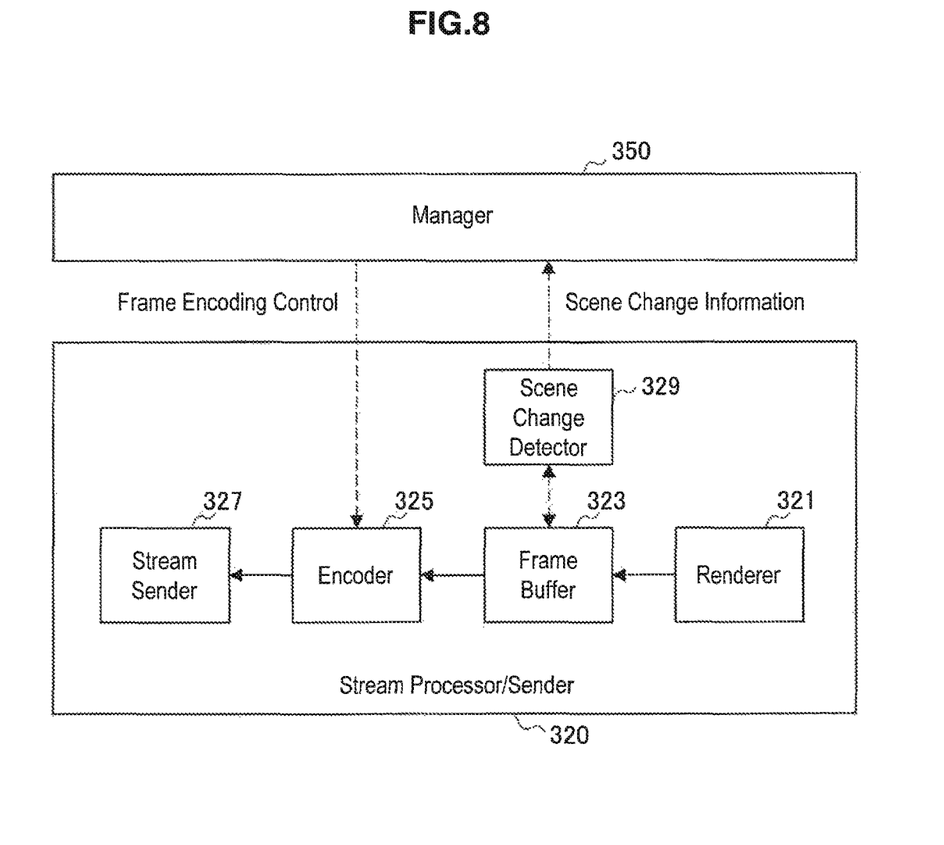
FIG. 8 is a diagram for explaining a second embodiment of the present disclosure.

FIG. 8 is a diagram for explaining the second embodiment of the present disclosure. As to the embodiment, in the stream processor/sender 320 of the server 300, the scene change detector 329 detects the occurrence of the scene change in the frame images to provide the scene change information to the manager 350, and the manager 350 controls the encoding on the frame image in the encoder 325 based on the scene change information.

In the embodiment, when the renderer 321 detects the occurrence of the scene change in the generated frame images, it adds additional information indicating the occurrence of the scene change to the data of the frame image before or after the scene change (regardless of before or after as long as it is compatible with a configuration of the scene change detector mentioned later). Any form of the additional information is possible.

The scene change detector 329 searches for data having the above-mentioned additional information among the data of the frame images temporarily accumulated in the frame buffer 323. When the data having the additional information is found, the scene change detector 329 provides the scene change information to the manager 350. Herein, between which frames the scene change occurs can be identified, for example, by the scene change detector 329 or the manager 350 sharing configuration information regarding the addition of the additional information in the renderer 321 (to which data of the frame images before and after the scene change the additional information is added).

The manager 350 controls the encoding on the frame images by the encoder 325 based on the scene change information acquired from the scene change detector 329 similarly to the above-mentioned first embodiment. Thereby, for example, the encoder 325 encodes the frame after the scene change as the intra-frame. Moreover, the encoder 325 may output the encoded data of the frame image before the scene change instead during the encoding processing on the frame image after the scene change.

(Modification)

Figure 9:
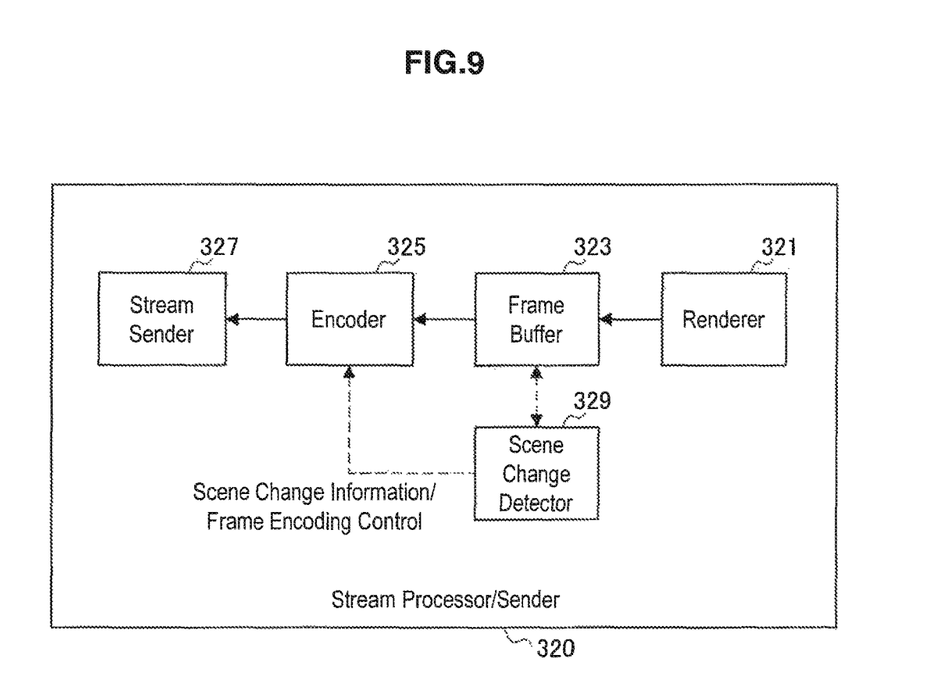
FIG. 9 is a diagram for explaining a modification of the second embodiment of the present disclosure.

FIG. 9 is a diagram for explaining a modification of the second embodiment of the present disclosure. In the modification, the scene change detector 329 or the encoder 325 itself functions as the encoder controller.

More specifically, the scene change detector 329 provides the scene change information to the encoder 325 when the data having the additional information which is added by the renderer 321 is found among the data of the frame images temporarily accumulated in the frame buffer 323. The encoder 325 acquires the scene change information, and controls itself so as to encode the frame after the scene change as the intra-frame.

Otherwise, the scene change detector 329 may control and cause the encoder 325 to encode the frame after the scene change as the intra-frame when the data having the additional information which is added by the renderer 321 is found among the data of the frame images temporarily accumulated in the frame buffer 323.

(3. Hardware Configuration)

Figure 10:
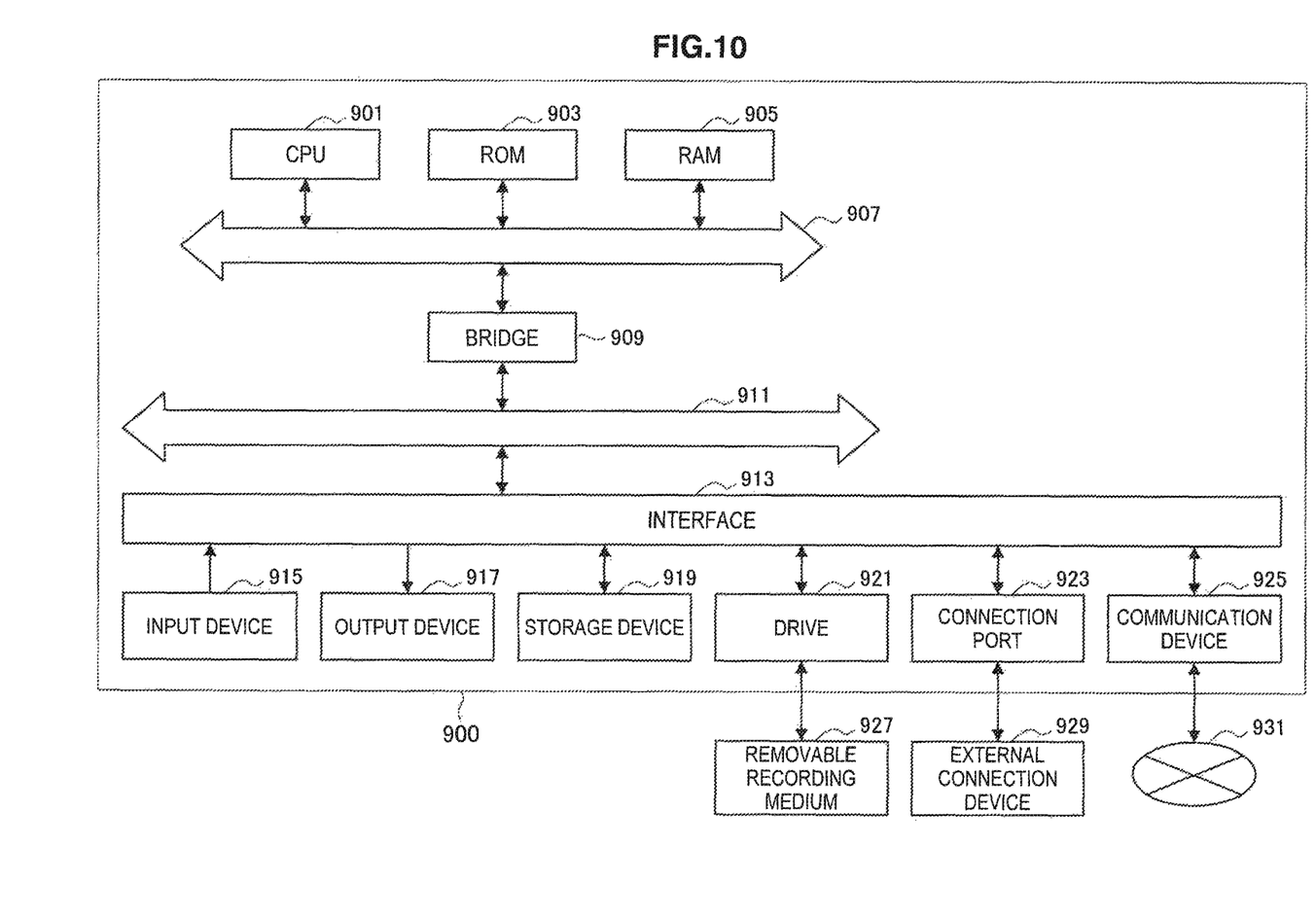
FIG. 10 is a block diagram for explaining a hardware configuration of an information processing apparatus.

Next, with reference to FIG. 10, a hardware configuration of an information processing apparatus according to an embodiment of the present disclosure will be described. FIG. 10 is a block diagram showing a hardware configuration of an information processing apparatus. An information processing apparatus 900 which is shown may achieve the client 100 and the server 300 in the above described embodiments, for example.

The information processing apparatus 900 includes a central processing unit (CPU) 901, read only memory (ROM) 903, and random access memory (RAM) 905. Further, the information processing apparatus 900 may also include a host bus 907, a bridge 909, an external bus 911, an interface 913, an input device 915, an output device 917, a storage device 919, a drive 921, a connection port 923, and a communication device 925. The information processing apparatus 900 may also include, instead of or along with the CPU 901, a processing circuit such as a digital signal processor (DSP).

The CPU 901 functions as an arithmetic processing unit and a control unit and controls an entire operation or a part of the operation of the information processing apparatus 900 according to various programs recorded in the ROM 903, the RAM 905, the storage device 919, or a removable recording medium 927. The ROM 903 stores programs and arithmetic parameters used by the CPU 901. The RAM 905 primarily stores programs used in execution of the CPU 901 and parameters and the like varying as appropriate during the execution. The CPU 901, the ROM 903, and the RAM 905 are connected to each other via the host bus 907 configured from an internal bus such as a CPU bus or the like. In addition, the host bus 907 is connected to the external bus 911 such as a peripheral component interconnect/interface (PCI) bus via the bridge 909.

The input device 915 is a device operated by a user, such as a mouse, a keyboard, a touch panel, buttons, a switch, and a lever. Also, the input device 915 may be a remote control device using, for example, infrared light or other radio waves, or may be an external connection device 929 such as a cell phone compatible with the operation of the information processing apparatus 900. The input device 915 includes an input control circuit that generates an input signal on the basis of information input by the user and outputs the input signal to the CPU 901. The user inputs various kinds of data to the information processing apparatus 900 and instructs the information processing apparatus 900 to perform a processing operation by operating the input device 915.

The output device 917 is configured from a device capable of visually or aurally notifying the user of acquired information. For example, the output device 917 may be: a display device such as a liquid crystal display (LCD), a plasma display panel (PDP), or an organic electro-luminescence (EL) display; an audio output device such as a speaker or headphones; or a printer. The output device 917 outputs results obtained by the processing performed by the information processing apparatus 900 as video in the form of text or an image or as audio in the form of audio or sound.

The storage device 919 is a device for storing data configured as an example of a storage unit of the information processing apparatus 900. The storage device 919 is configured from, for example, a magnetic storage device such as a hard disk drive (HDD), a semiconductor storage device, an optical storage device, or a magneto-optical storage device. This storage device 919 stores programs to be executed by the CPU 901, various data, and various data obtained from the outside.

The drive 921 is a reader/writer for the removable recording medium 927 such as a magnetic disk, an optical disc, a magneto-optical disk, or a semiconductor memory, and is built in or externally attached to the information processing apparatus 900. The drive 921 reads out information recorded on the attached removable recording medium 927, and outputs the information to the RAM 905. Further, the drive 921 writes the record on the attached removable recording medium 927.

The connection port 923 is a port for allowing devices to directly connect to the information processing apparatus 900. Examples of the connection port 923 include a universal serial bus (USB) port, an IEEE1394 port, and a small computer system interface (SCSI) port. Other examples of the connection port 923 may include an RS-232C port, an optical audio terminal, and a high-definition multimedia interface (HDMI) port. The connection of the external connection device 929 to the connection port 923 may enable the various data exchange between the information processing apparatus 900 and the external connection device 929.

The communication device 925 is a communication interface configured from, for example, a communication device for establishing a connection to a communication network 931. The communication device 925 is, for example, a wired or wireless local area network (LAN), Bluetooth (registered trademark), a communication card for wireless USB (WUSB), or the like. Alternatively, the communication device 925 may be a router for optical communication, a router for asymmetric digital subscriber line (ADSL), a modem for various communications, or the like. The communication device 925 can transmit and receive signals and the like using a certain protocol such as TCP/IP on the Internet and with other communication devices, for example. The communication network 931 connected to the communication device 925 is configured from a network which is connected via wire or wirelessly and is, for example, the Internet, a home-use LAN, infrared communication, radio wave communication, and satellite communication.

Heretofore, an example of the hardware configuration of the information processing apparatus 900 has been shown. Each of the structural elements described above may be configured using a general-purpose material, or may be configured from hardware dedicated to the function of each structural element. The configuration may be changed as appropriate according to the technical level at the time of carrying out embodiments.

(4. Supplement)

Embodiments of the present disclosure can include, for example, the encoding control apparatus (for example, included in the server) and the system as described above, a method performed in the encoding control apparatus or the system, a program for causing the encoding control apparatus to function, and a recording medium in which the program is recorded.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Additionally, the present technology may also be configured as below.

(1)

An encoding control apparatus including:

a scene change detector that detects occurrence of scene change in frame images generated in real time by a renderer, and an encoder controller that controls an encoder that encodes each of the frame images in any of a first scheme in which another frame image is not referred to and a second scheme in which the other frame image is referred to, the encoder controller causing the encoder to encode a frame image after the scene change in the first scheme when the occurrence of the scene change is detected.

(2)

The encoding control apparatus according to (1), wherein the encoder controller causes, while the encoder is encoding the frame image after the scene change in the first scheme, data obtained by encoding a frame image before the scene change to be output instead.

(3)

The encoding control apparatus according to (2), wherein the encoder controller causes the data obtained by encoding the 26 frame image before the scene change to be output during the predetermined number of frames when the occurrence of the scene change is detected.

(4)

The encoding control apparatus according to (2) or (3), wherein the encoder controller further controls the renderer to cause the frame image before the scene change to be output from the renderer to the encoder, and causes data obtained by encoding the frame image before the scene change in the second scheme to be output when the occurrence of the scene change is detected.

(5)

The encoding control apparatus according to any one of (1) to (4), wherein the scene change detector is included in the renderer.

(6)

The encoding control apparatus according to any one of (1) to (4), wherein the scene change detector detects the occurrence of the scene change on the basis of information given by the renderer.

(7)

The encoding control apparatus according to (6), wherein the scene change detector detects the occurrence of the scene change by referring to additional information added to data of the frame image before or after the scene change by the renderer.

(8)

The encoding control apparatus according to (7), wherein the scene change detector searches for data having the additional information among data of the frame images accumulated in a frame buffer.

(9)

The encoding control apparatus according to any one of (1) to (8), further including:

a sender that sends data output from the encoder to a client apparatus via a network.

(10)

The encoding control apparatus according to (9), further including:

a receiver that receives operation input acquired in the client apparatus via the network, wherein the renderer generates, in real time, the frame images according to the operation input.

(11)

An encoding control method including:

detecting occurrence of scene change in frame images generated in real time by a renderer, and controlling an encoder that encodes each of the frame images in any of a first scheme in which another frame image is not referred to and a second scheme in which the other frame image is referred to, and causing the encoder to encode a frame image after the scene change in the first scheme when the occurrence of the scene change is detected.

REFERENCE SIGNS LIST

10 Streaming system
100 Client
140 Stream receiver/processor
141 Stream receiver
143 Decoder
145 Frame buffer
147 Renderer
160 Manager
210 Servicer
220 Node
230 Edge
300 Server
320 Stream processor/sender
321 Renderer
323 Frame buffer
325 Encoder
327 Stream sender
329 Scene change detector

The invention claimed is:

1. An encoding control apparatus comprising:

a scene change detector that detects occurrence of scene change in frame images generated in real time by a renderer; and an encoder controller that controls an encoder that encodes each of the frame images in any of a first scheme in which another frame image is not referred to and a second scheme in which the another frame image is referred to, the encoder controller causing the encoder to encode a frame image after the scene change in the first scheme when the occurrence of the scene change is detected, wherein the encoder controller causes, while the encoder is delayed encoding the frame image after the scene change in the first scheme, data obtained by encoding a frame image before the scene change to be displayed for a predetermined plurality number of frames, and wherein the scene change detector and the encoder controller are each implemented via at least one processor.

2. The encoding control apparatus according to claim 1, wherein the encoder controller causes the data obtained by encoding the frame image before the scene change to be displayed for the predetermined plurality number of frames when the occurrence of the scene change is detected.

3. The encoding control apparatus according to claim 1, wherein the encoder controller further controls the renderer to cause the frame image before the scene change to be output from the renderer to the encoder, and causes data obtained by encoding the frame image before the scene change in the second scheme to be output when the occurrence of the scene change is detected.

4. The encoding control apparatus according to claim 1, wherein the scene change detector is included in the renderer.

5. The encoding control apparatus according to claim 1, wherein the scene change detector detects the occurrence of the scene change on a basis of information given by the renderer.

6. The encoding control apparatus according to claim 5, wherein the scene change detector detects the occurrence of the scene change by referring to additional information added to data of the frame image before or after the scene change by the renderer.

7. The encoding control apparatus according to claim 6, wherein the scene change detector searches for data having the additional information among data of the frame images accumulated in a frame buffer.

8. The encoding control apparatus according to claim 1, further comprising:

a sender that sends data output from the encoder to a client apparatus via a network, wherein the sender is implemented via at least one processor.

9. The encoding control apparatus according to claim 8, further comprising:

a receiver that receives operation input acquired in the client apparatus via the network, wherein the renderer generates, in real time, the frame images according to the operation input, and wherein the receiver is implemented via at least one processor.

10. The encoding control apparatus according to claim 1, wherein the encoder controller further causes the encoder to encode the frame image before the scene change in the second scheme.

11. An encoding control method comprising:

detecting occurrence of scene change in frame images generated in real time by a renderer; and controlling an encoder that encodes each of the frame images in any of a first scheme in which another frame image is not referred to and a second scheme in which the another frame image is referred to, and causing the encoder to encode a frame image after the scene change in the first scheme when the occurrence of the scene change is detected, wherein the encoder is controlled to cause, while the encoder is delayed encoding the frame image after the scene change in the first scheme, data obtained by encoding a frame image before the scene change to be displayed for a predetermined plurality number of frames.

12. The encoding control method according to claim 11, wherein the encoder is further controlled to cause the frame image before the scene change be encoded in the second scheme.

13. A non-transitory computer-readable medium having embodied thereon a program, which when executed by a computer causes the computer to execute a method, the method comprising:
   detecting occurrence of scene change in frame images generated in real time by a renderer; and
   controlling an encoder that encodes each of the frame images in any of a first scheme in which another frame image is not referred to and a second scheme in which the another frame image is referred to, and causing the encoder to encode a frame image after the scene change in the first scheme when the occurrence of the scene change is detected,
   wherein the encoder is controlled to cause, while the encoder is delayed encoding the frame image after the scene change in the first scheme, data obtained by encoding a frame image before the scene change to be displayed for a predetermined plurality number of frames.

14. The non-transitory computer-readable medium according to claim 13, wherein the encoder is further caused to encode the frame image before the scene change in the second scheme.

* * * * *